US011032113B2

(12) United States Patent
Wiklund et al.

(10) Patent No.: US 11,032,113 B2
(45) Date of Patent: Jun. 8, 2021

(54) APPARATUS AND METHODS FOR HYBRID VECTOR BASED POLAR MODULATOR

(71) Applicant: QUALCOMM Incorporated, San Diego, CA (US)

(72) Inventors: Magnus Olov Wiklund, San Jose, CA (US); Emanuele Lopelli, Laguna Niguel, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/141,922

(22) Filed: Sep. 25, 2018

(65) Prior Publication Data

US 2020/0099558 A1    Mar. 26, 2020

(51) Int. Cl.
*H04L 27/20* (2006.01)
*H04B 1/04* (2006.01)

(52) U.S. Cl.
CPC ....... *H04L 27/2082* (2013.01); *H04B 1/0483* (2013.01)

(58) Field of Classification Search
CPC ........ H03C 3/40; H03C 3/403; H03G 3/3042; H04B 1/04; H04B 1/0483; H04B 2001/0408; H04L 27/20; H04L 27/2042; H04L 27/2053; H04L 27/2067; H04L 27/2082; H04L 27/362; H04L 27/363
USPC ................ 375/261, 279–281, 297–299, 308; 332/103, 144, 145; 455/102, 103, 127.3
See application file for complete search history.

(56) References Cited

U.S. PATENT DOCUMENTS

| | | | |
|---|---|---|---|
| 4,577,163 A | 3/1986 | Culp | |
| 7,260,368 B1* | 8/2007 | Blumer | H03D 7/1433 375/261 |
| 7,532,679 B2 | 5/2009 | Staszewski et al. | |
| 7,656,964 B1* | 2/2010 | DeCoste | H03F 3/24 330/149 |
| 7,852,970 B2 | 12/2010 | Rofougaran | |
| 8,204,107 B2 | 6/2012 | Zhuang et al. | |
| 8,655,292 B2* | 2/2014 | Kawasaki | H03F 1/0294 330/10 |
| 8,861,626 B2 | 10/2014 | Cheng et al. | |
| 9,344,038 B2 | 5/2016 | Hur et al. | |
| 9,419,657 B1 | 8/2016 | Li Puma et al. | |
| 2002/0011947 A1* | 1/2002 | Stolarczyk | F41H 11/12 342/22 |
| 2004/0101065 A1 | 5/2004 | Hagh et al. | |
| 2004/0184559 A1 | 9/2004 | Ballantyne | |

(Continued)

FOREIGN PATENT DOCUMENTS

EP        2685690 A1    1/2014

OTHER PUBLICATIONS

International Search Report and Written Opinion—PCT/US2019/046279—ISA/EPO—dated Dec. 3, 2019.

*Primary Examiner* — Young T. Tse
(74) *Attorney, Agent, or Firm* — Muncy, Geissler, Olds & Lowe, P.C.

(57) ABSTRACT

Examples herein disclose apparatus and systems for hybrid vector based polar modulator schemes that may use a series of polar modulators to create a system of vector modulators. The resulting polar response may be de-composed into the sum of the polar modulators. This approach allows accurate phase modulation in two such links without the need for high resolution AM part to cover the IQ plane of a QAM modulator.

16 Claims, 8 Drawing Sheets

(56) References Cited

U.S. PATENT DOCUMENTS

| | | | |
|---|---|---|---|
| 2011/0090988 A1 | 4/2011 | Brillant et al. | |
| 2013/0049861 A1* | 2/2013 | Lozhkin | H03F 1/0294 |
| | | | 330/185 |
| 2014/0016723 A1 | 1/2014 | Mu et al. | |
| 2014/0120854 A1* | 5/2014 | Briffa | H03G 3/3042 |
| | | | 455/127.3 |
| 2015/0061775 A1* | 3/2015 | Qureshi | H03F 1/0288 |
| | | | 330/295 |
| 2015/0117567 A1* | 4/2015 | Winoto | H03F 3/211 |
| | | | 375/297 |
| 2015/0256272 A1* | 9/2015 | Weissman | H04B 17/13 |
| | | | 455/84 |
| 2016/0204970 A1* | 7/2016 | Hori | H04L 27/3405 |
| | | | 375/298 |
| 2016/0353294 A1* | 12/2016 | Wang | H04B 7/0456 |
| 2018/0124762 A1 | 5/2018 | Zeng et al. | |
| 2018/0206199 A1* | 7/2018 | Harel | H04W 88/085 |

\* cited by examiner

APPARATUS AND METHODS FOR HYBRID VECTOR BASED POLAR MODULATOR

FIELD OF DISCLOSURE

This disclosure relates generally to polar modulators, and more specifically, but not exclusively, to vector based polar modulators.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and space). An important modulation technique utilized by these wireless systems is quadrature amplitude modulation (QAM). QAM is the name of a family of digital modulation methods and a related family of analog modulation methods widely used in modern telecommunications to transmit information. It conveys two analog message signals, or two digital bit streams, by changing (modulating) the amplitudes of two carrier waves, using the amplitude-shift keying (ASK) digital modulation scheme or amplitude modulation (AM) analog modulation scheme. The two carrier waves of the same frequency, usually sinusoids, are out of phase with each other by 90° and are thus called quadrature carriers or quadrature components—hence the name of the scheme. The modulated waves are summed, and the final waveform is a combination of both phase-shift keying (PSK) and amplitude-shift keying (ASK), or, in the analog case, of phase modulation (PM) and amplitude modulation. In the digital QAM case, a finite number of at least two phases and at least two amplitudes are used. PSK modulators are often designed using the QAM principle, but are not considered as QAM since the amplitude of the modulated carrier signal is constant. QAM is used extensively as a modulation scheme for digital telecommunication systems, such as in 802.11 Wi-Fi standards. Arbitrarily high spectral efficiencies can be achieved with QAM by setting a suitable constellation size, limited only by the noise level and linearity of the communications channel See, for example, U.S. Pat. No. 8,861,626 (expressly incorporated herein by reference in its entirety).

QAM systems may use IQ architectures for the radio frequency (RF) signal generation or Polar architectures for the RF signal generation in QAM systems. IQ architectures are well suited for generating QAM constellation diagrams discretized in I ($N_i$) and Q ($N_q$). Polar architectures are well suited for generating constellation diagrams discretized in magnitude ($N_{mag}$) and phase ($N_{phase}$). See, for example, U.S. Pat. No. 9,344,038 (incorporated herein by reference in its entirety). IQ architectures have two branches of circuits, one for I and one for Q, whereas polar architectures only have one branch. One important implication is that a polar architecture in general has lower power consumption—in many cases the power consumption for a polar architecture is half of the power consumption for an IQ architecture. Power amplifiers can be made much more efficient for constant envelope modulations with polar architectures compared to IQ architectures which typically require handling a wider range of input magnitudes (which is the same as saying they require a higher peak to average ratio). Using polar architectures for generating higher order QAM is challenging since the required resolutions increases ($N_{mag} \times N_{phase} \gg N_i \times N_q$). Polar architectures are fundamentally much more power efficient than traditional IQ architectures. In generating high order QAM, IQ modulators are efficiently mapped with each discretization point naturally mapped to I and Q. Since a polar architecture is not mapped to I and Q it requires high resolution and makes high order QAM a challenge to implement.

Accordingly, there is a need for systems, apparatus, and methods that overcome the deficiencies of conventional approaches, such as generating high order QAM without high accuracy in the magnitude of the polar modulator, including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a polar modulator circuit comprises: a first phase shifting circuit configured to input a first phase signal; a first power amplifier (PA) coupled to the first phase shifting circuit and configured to input a first state signal and output a first modulation signal, wherein the first modulation signal represents a first link of N links; a second phase shifting circuit configured to input a second phase signal; a second PA coupled to the second phase shifting circuit and configured to input a second state signal and output a second modulation signal, wherein the second modulation signal represents a second link of N links; a third phase shifting circuit configured to input a third phase signal; a third PA coupled to the third phase shifting circuit and configured to input a third state signal and output a third modulation signal, wherein the third modulation signal represents a third link of N links; and a summation circuit configured to input the N links and output a modulated transmission signal.

In another aspect, a method for polar modulation comprises: inputting a first phase signal to a first phase shifting circuit; inputting a second phase signal to a second phase shifting circuit; inputting a third phase signal to a third phase shifting circuit; inputting a first state signal to a first power amplifier (PA); outputting, by the first PA, a first modulation signal based on the first state signal, wherein the first modulation signal represents a first link of N links; inputting a second state signal to a second PA; outputting, by the second PA, a second modulation signal based on the second state signal, wherein the second modulation signal represents a second link of N links; inputting a third state signal to a third PA; outputting, by the third PA, a third modulation signal based on the third state signal, wherein the third modulation signal represents a third link of N links; summing the N links; and outputting a modulated transmission signal based on the summing.

In still another aspect, a non-transitory computer-readable medium comprising instructions that when executed by a processor cause the processor to perform a method comprising: inputting a first phase signal to a first phase shifting circuit; inputting a second phase signal to a second phase shifting circuit; inputting a third phase signal to a third phase shifting circuit; inputting a first state signal to a first power amplifier (PA); outputting, by the first PA, a first modulation signal based on the first state signal, wherein the first modulation signal represents a first link of N links; inputting a second state signal to a second PA; outputting, by the second PA, a second modulation signal based on the second state signal, wherein the second modulation signal represents a second link of N links; inputting a third state signal to a third PA; outputting, by the third PA, a third modulation signal based on the third state signal, wherein the third modulation signal represents a third link of N links; summing the N links; and outputting a modulated transmission signal based on the summing.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1A:
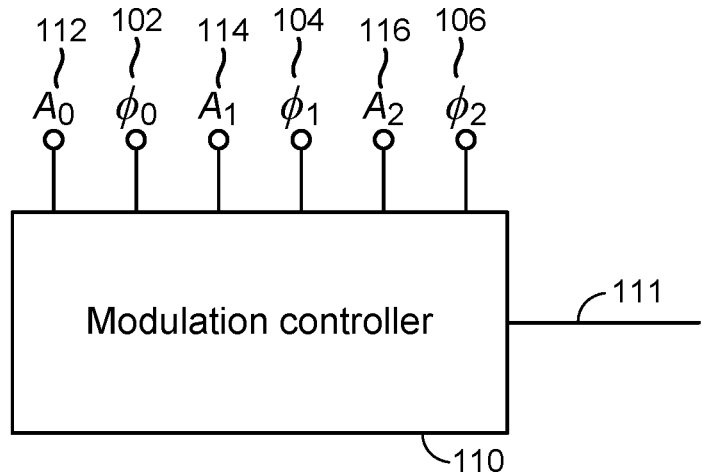
FIG. 1A illustrates an exemplary modulation controller in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. For example, a hybrid polar modulator may use a series of polar modulators to create a system of vector modulators with the resulting polar response decomposed into the sum of polar modulators. This approach may rely on accurate phase modulation in two such links without the need for high resolution Amplitude Modulation (AM) part to cover the IQ plane of a QAM modulator. In one example, a Quadrature PSK (QPSK) modulation is achieved with either a QPSK phase modulator or with a 2-PSK modulator in combination with a sign modulator. In this approach, sign and phase transitions are shaped to limit generated distortion and spectral regrowth wherein each power amplifier (PA) is operating with a constant input envelope and gain transitions are shaped to limit generated distortion. In another example, a QPSK modulation is achieved with a 2-PSK modulator in cascade with a sign modulator. The 2-PSK modulator generates +/−π/4 phase shift. A π/2 phase shift is generated by sign modulator and vector summation is used for high order modulation.

FIG. 1A illustrates an exemplary modulation controller in accordance with some examples of the disclosure. As shown in FIG. 1A, a modulation controller 110 may input data 111 (e.g., data to be transmitted) that is converted into polar components for subsequent processing prior to transmission. The modulation controller 110 inputs the data 111 and converts the data into a first phase signal 102, a second phase signal 104, a third phase signal 106, a first state signal 112, a second state signal 114, and a third state signal 116.

Figure 1B:
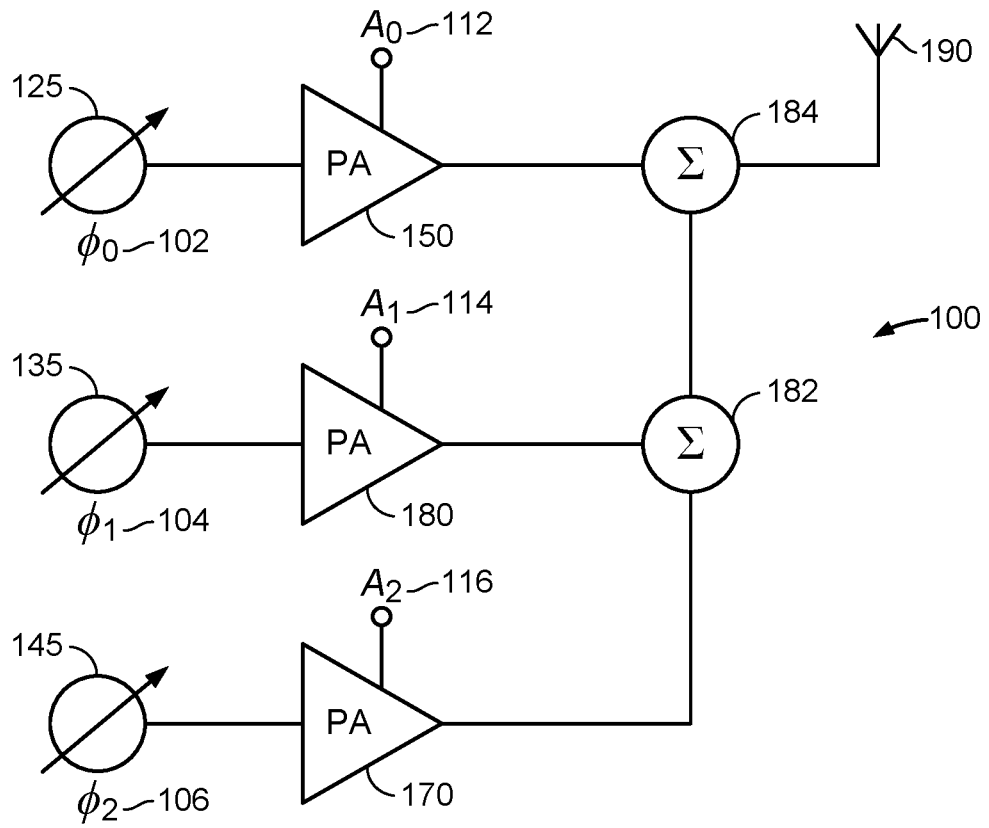
FIG. 1B illustrates exemplary power amplifiers with constant input envelopes in accordance with some examples of the disclosure.

FIG. 1B illustrates exemplary power amplifiers with constant input envelopes in accordance with some examples of the disclosure. As shown in FIG. 1B, a polar modulation circuit 100 may include a first 2-PSK modulator 125 that inputs a first phase signal 102 coupled to a first PA 150 that inputs a first state signal 112, a second 2-PSK modulator 135 that inputs a second phase signal 104 coupled to a second PA 160 that inputs a second state signal 114, and a third 2-PSK modulator 145 that inputs a third phase signal 106 coupled to a third PA 170 that inputs a third state signal 116. The outputs of the third PA 170 and the second PA 160 may be input to a first summation circuit 182. The output of the first summation circuit 182 may be input to a second summation circuit 184 along with the output of the first PA 150. The output of the second summation circuit 184 may be coupled to an antenna 190 for transmission. Thus, QPSK modulation may be achieved with a 2-PSK modulator in combination with a sign modulator wherein sign and phase transitions are shaped to limit generated distortion and spectral regrowth, each PA is operating with a constant input envelope, and gain transitions are shaped to limit generated distortion using a 2-PSK modulator that generates +/−π/4 phase shift, a sign modulator that generates a π/2 phase shift, and vector summation for high order modulation.

Figure 1C:
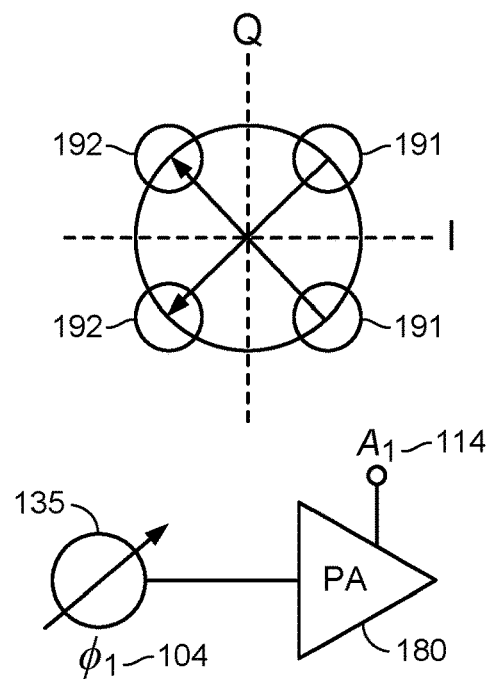
FIG. 1C illustrates an exemplary QPSK modulation in accordance with some examples of the disclosure.

FIG. 1C illustrates an exemplary QPSK modulation in accordance with some examples of the disclosure. As shown in FIG. 1C, QPSK modulation may be achieved with a 2-PSK modulator in cascade with a sign modulator. As shown, a second 2-PSK modulator 135 inputs a second phase signal 104 is coupled to a second PA 160 that inputs a second state signal 114. The plot shown in FIG. 1C illustrates the 2-PSK modulator generated +/−π/4 phase shift 191 and the π/2 phase shift 192 generated by sign modulator.

Figure 1D:
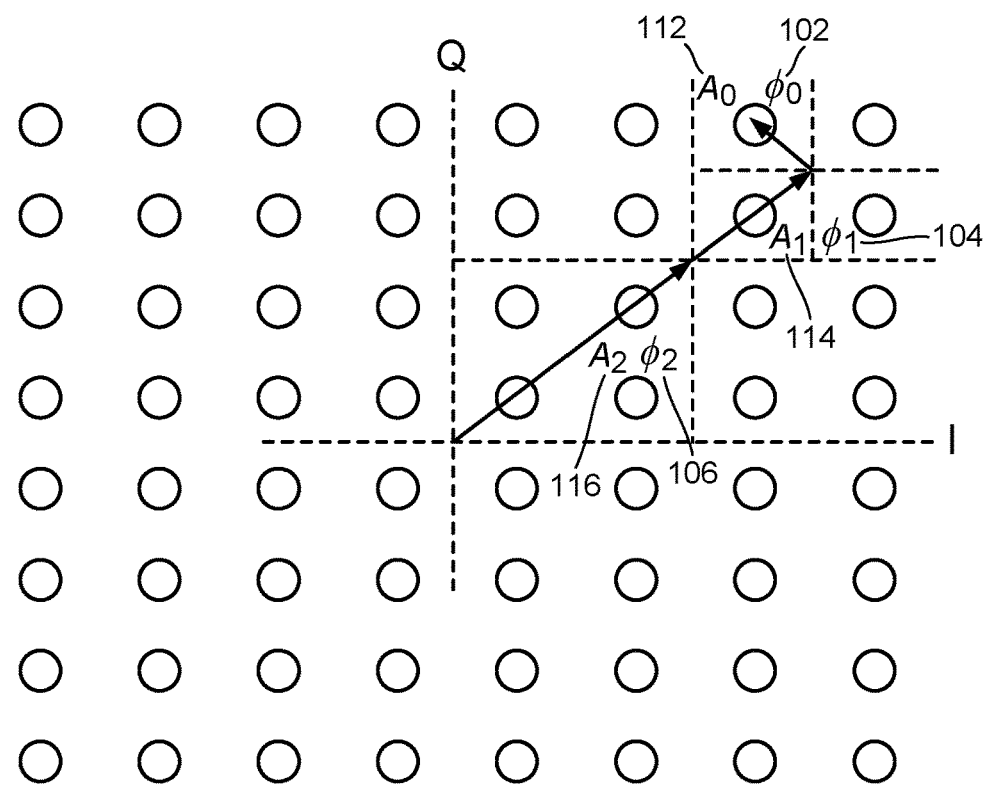
FIG. 1D illustrates an exemplary constellation plot in accordance with some examples of the disclosure.

FIG. 1D illustrates an exemplary constellation plot in accordance with some examples of the disclosure. As shown in FIG. 1D, a uniform constellation plot in the IQ plane includes a plurality of constellation points with each constellation point representing a symbol (e.g., data bit or word). As shown in FIG. 1D, the vector summation of the first 2-PSK modulator 125 and the first PA 150 (first phase signal 102 and first state signal 112), the second 2-PSK modulator 135 and the second PA 160 (second phase signal 104 and second state signal 114), and the third 2-PSK modulator 145 and the third PA 170 (third phase signal 106 and third state signal 116).

QPSK modulation and a 2-PSK modulator (e.g., first 2-PSK modulator 125, second 2-PSK modulator 135, third 2-PSK modulator 145) may be implemented with an ADPLL direct RF modulator. An ADPLL is a PLL implemented only by digital blocks. See, for example, U.S. Pat. No. 4,577,163 expressly incorporated herein in its entirety. The signal are digital (binary) and may be a single digital signal or a combination of parallel digital signals. In a carefully designed ADPLL based systems, Error Vector Management (EVM) is proven to be extremely low due to accurate digital feedback of the phase. This allows support for fine grain adjustments to adjust for desired constellation point. In addition, calibration may be done with additional output/gain transistors for trimming gain and the output stage of the PA is ideally operating in current mode to enable simple signal combining for vector summation. Also, a cross-coupled output structure is beneficial for implementing gain and sign modulator function—otherwise gain changes may induce load changes causing distortion. It should be understood that a PLL or any phase shifting circuit able to adjust the phase of a signal may be used in place of an ADPLL, and may include any other modulation circuits such as IQ modulators and QAM modulator. Furthermore, in the context of this disclosure, we may use N as an arbitrary number in the process of describing segmented implementation of PA's and summation links.

Any variable gain PA structure may be used for the AM part. Each PA has at least three states: OFF, +ON, −ON and these states (e.g., first state signal 112, second state signal 114, and third state signal 116) may be segmented in a binary fashion or any other suitable segmentation:

$A_0$ represents LSB with unit weight $\{1,0,-1\}$ U.
$A_k$ represents the strength of path k with weight $\{1,0,-1\}$ $2^k$ U
$A_{N-1}$ represents MSB with weight $\{1,0,-1\}$ $2^{N-1}$ U Variable gain frequency converters may also be used for the AM part. Cross-coupled mixers are specifically suited for the implementation of the sign modulator. Vector summation of weighted gains can be done in current domain (just as described for PA structures). Input to the mixer is the constant envelope phase modulated signal (just as described for PA structures).

Figure 2:
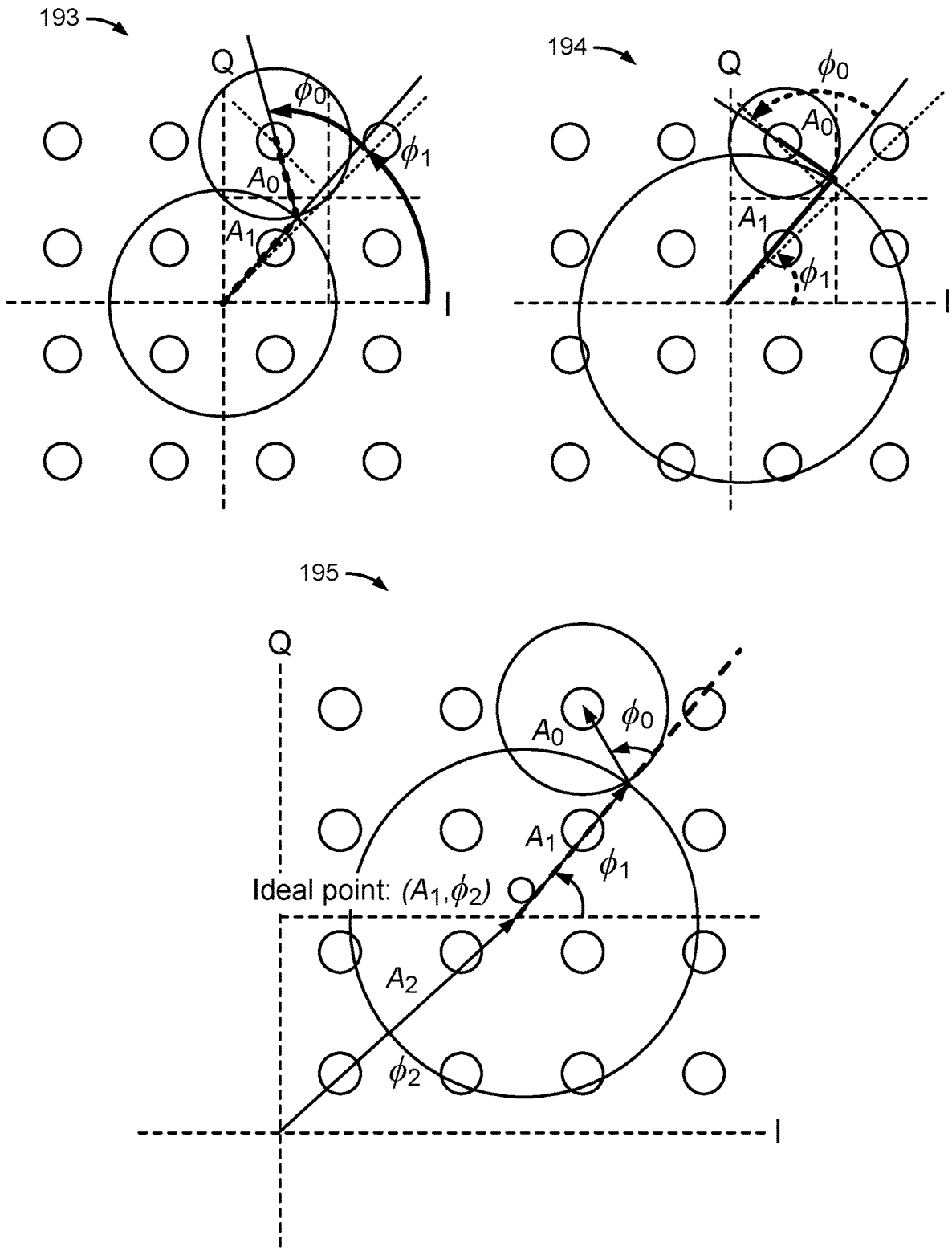
FIG. 2 illustrates exemplary modulation plots for vector based polar architectures in accordance with some examples of the disclosure.

FIG. 2 illustrates exemplary modulation plots for vector based polar architectures in accordance with some examples of the disclosure. The polar architectures described herein may be using for general modulation (not only QAM). Specifically, architectures herein provide the following advantages: fine resolution phase modulation (PM) with fixed gain settings—phase modulation is only needed for two polar paths; fine resolution amplitude modulation (AM) with fixed phase shifts—amplitude modulation is only needed in two paths; and both AM and PM wherein a system may have AM in one path and PM in another path. The reminder of the paths may have discrete settings (2 or more degrees of freedom for the vector system are required). FIG. 2 shows PM $(\Phi_1, \Phi_0)$ $A_1, A_0$ fixed in plot 193, AM $(A_1, A_0)$ $\Phi_1, \Phi_0$ fixed in plot 194, and discretization error of the reminder of paths represented by $(A_2, \Phi_2)$ with respect to the ideal point in plot 195. Thus, a particular architecture may be selected to meet performance in terms of accuracy and speed depending what is best in terms of implementation. In one example herein, an accurate ADPLL is chosen that provides phase modulation. Vector modulation is performed with variable phase modulation of two phases; $(\Phi_1, \Phi_0)$. $(A_2, \Phi_2)$ and $A_1, A_0$ does not need to be accurate. Inaccuracy in $(A_1, A_2, \Phi_2)$ is adjusted for by a corresponding phase shift in $(\Phi_1, \Phi_0)$. This allows generation of $(2^6)$ 64QAM. The resultant $(A_2, \Phi_2)$ may be generated from multiple links $(A_3, \Phi_3) \ldots (A_{N-1}, \Phi_{N-1})$ to extend to higher order $(2^{2N})$ QAM. For extra degree of freedom any link may be equipped with fine grain modulation; alternatively $(A_2, \Phi_2)$ may be calibrated to ensure modulating $(\Phi_1, \Phi_0)$ gives full coverage. It should be understood that, while this disclosure mentions QAM, the apparatus and methods disclosed herein apply to QAM or any other modulation.

Figure 3:
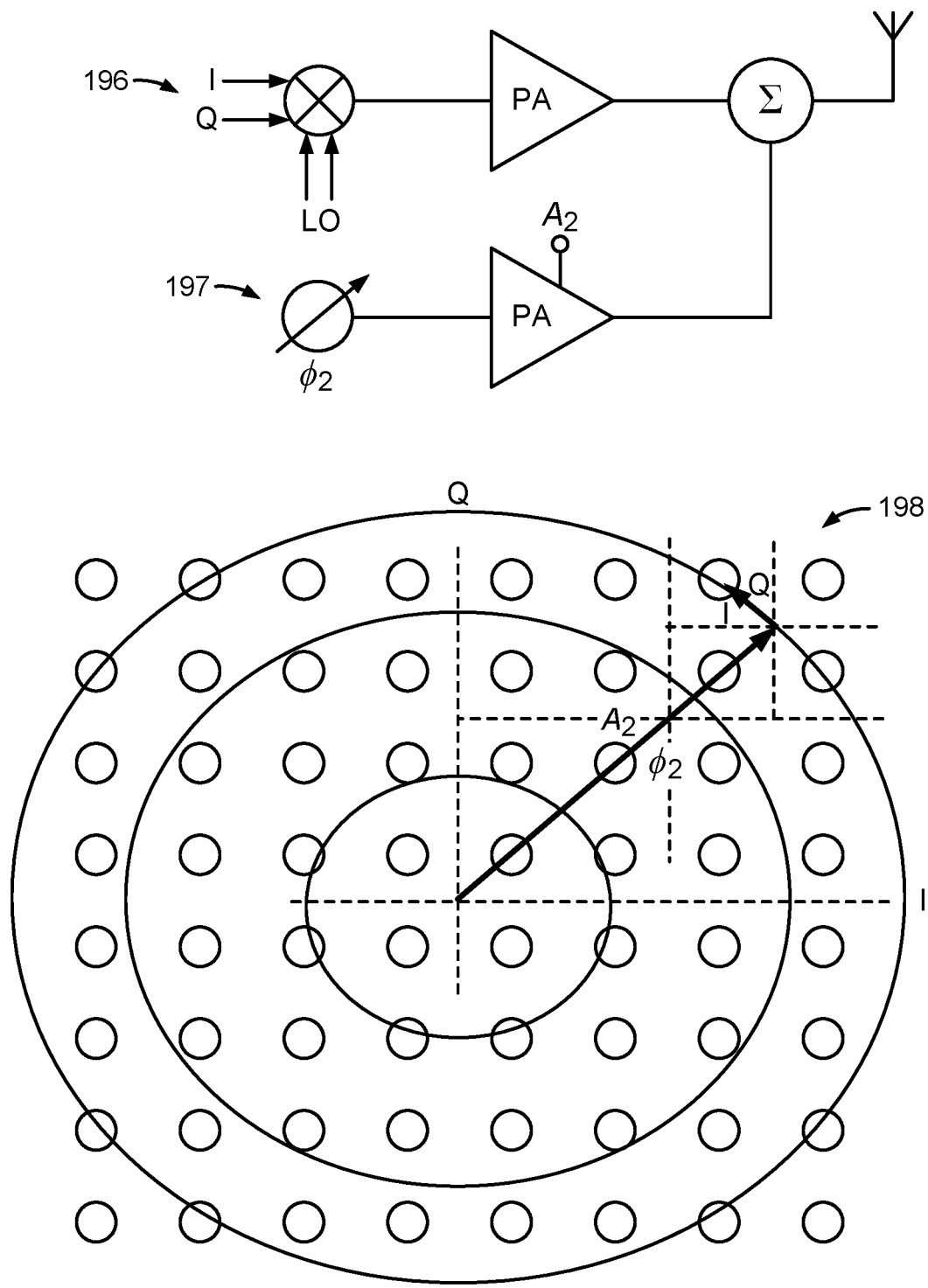
FIG. 3 illustrates an exemplary modulation circuit output plot in accordance with some examples of the disclosure.

FIG. 3 illustrates an exemplary modulation circuit output plot in accordance with some examples of the disclosure. As shown in FIG. 3, polar and IQ architectures may be combined to meet performance in terms of accuracy, speed and power consumption. As shown FIG. 3, an IQ modulator 196 gives accuracy and polar architecture 197 gives power efficiency. The QAM modulation is performed with IQ modulation (I, Q) and $(A_2, \Phi_2)$ is generated with a polar modulator. Thus, a $(2^6)$ 64QAM is generated. As shown in plot 198, the polar part only needs to generate 3 magnitude and 3 phase levels per quadrant. The resultant $(A_2, \Phi_2)$ may be generated from multiple links $(A_3, \Phi_3) \ldots (A_{N-1}, \Phi_{N-1})$ to extend to higher order $(2^{2N})$ QAM. Any hybrid configuration of polar $(A_j, \Phi_j)$ and QAM $(I_k, Q_k)$ modulators may be considered depending on suitable implementations.

Figure 4:
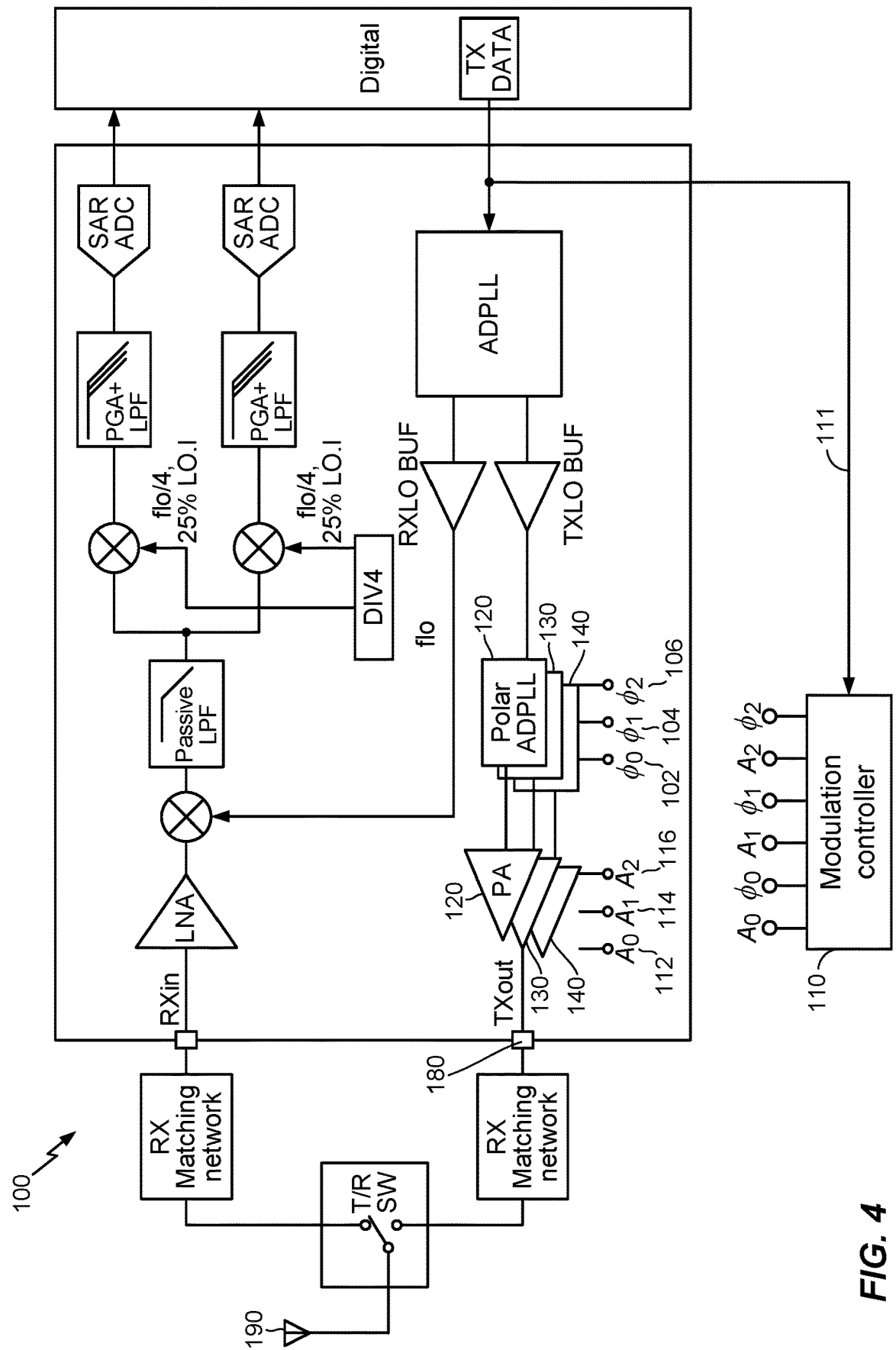
FIG. 4 illustrates an exemplary hybrid polar modulation circuit in accordance with some examples of the disclosure.

FIG. 4 illustrates an exemplary hybrid polar modulation circuit in accordance with some examples of the disclosure. As shown in FIG. 4, a polar modulation circuit 100 may include a modulation controller 110 that inputs data 111 to be modulated and transmitted, a first ADPLL 120 (e.g., a phase shifting circuit), a second ADPLL 130 (e.g., a phase shifting circuit), a third ADPLL 140 (e.g., a phase shifting circuit), a first PA 150, a second PA 160, a third PA 170, a summation circuit 180, and an antenna 190. The modulation controller 110 may generate the first phase signal 102, the second phase signal 104, the third phase signal 106, the first state signal 112, the second state signal 114, and the third state signal 116 based on the input data 111 to ultimately generate a vector sum that corresponds to a constellation point that represents the input data 111. The first ADPLL 120 may input the first phase signal 102 and be coupled to the first PA 150, the second ADPLL 130 may input the second phase signal 104 and be coupled to the second PA 160, the third ADPLL 140 may input the third phase signal 106 and be coupled to the third PA 170. The first PA 150 may input the first state signal 112 and output a first modulation signal, the second PA 160 may input the second state signal 114 and output a second modulation signal, and the third PA 170 may input the third state signal 116 and output and a third modulation signal. The summation circuit 180 may input the first modulation signal, the second modulation signal, and the third modulation signal to generate and output a modulated transmission signal to antenna 190 for transmission.

Figure 5:
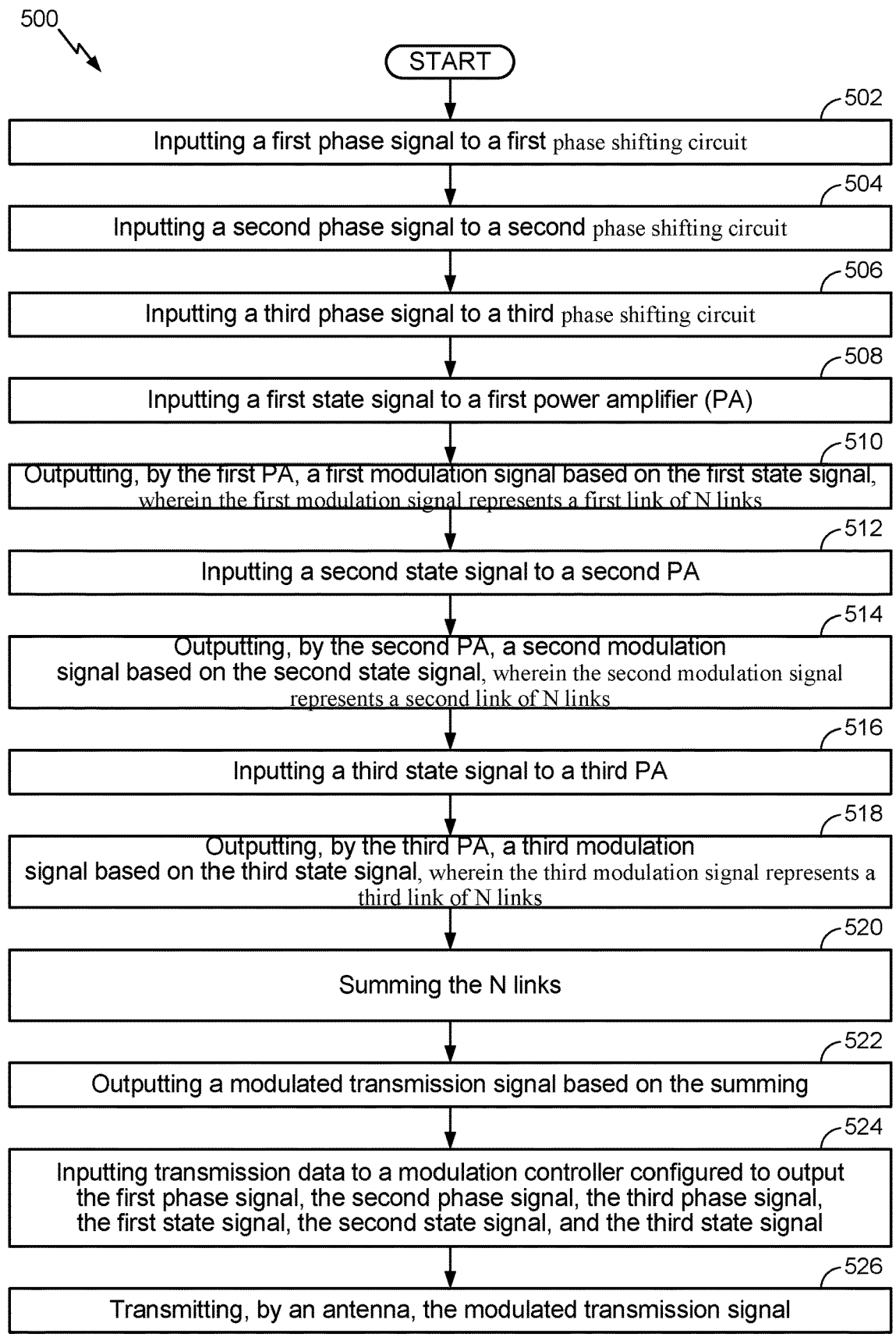
FIG. 5 illustrates an exemplary method of modulation in accordance with some examples of the disclosure.

FIG. 5 illustrates an exemplary method of modulation in accordance with some examples of the disclosure. As shown in FIG. 5, a partial method 500 for polar modulation begins in block 502 with inputting a first phase signal to a first phase shifting circuit (e.g., ADPLL). The partial method 500 continues in block 504 with inputting a second phase signal to a second phase shifting circuit (e.g., ADPLL). The partial method 500 continues in block 506 with inputting a third phase signal to a third phase shifting circuit (e.g., ADPLL).

The partial method 500 continues in block 508 with inputting a first state signal to a first power amplifier (PA). The partial method 500 continues in block 510 with outputting, by the first PA, a first modulation signal based on the first state signal, wherein the first modulation signal represents a first link of N links. The partial method 500 continues in block 512 with inputting a second state signal to a second PA. The partial method 500 continues in block 514 with outputting, by the second PA, a second modulation signal based on the second state signal, wherein the second modulation signal represents a second link of N links. The partial method 500 continues in block 516 with inputting a third state signal to a third PA. The partial method 500 continues in block 518 with outputting, by the third PA, a third modulation signal based on the third state signal, wherein the third modulation signal represents a third link of N links. The partial method 500 continues in block 520 with summing the N links. The partial method 500 may conclude in block 522 with outputting a modulated transmission signal based on the summing. Alternatively, the partial method 500 may continue in block 524 with inputting transmission data to a modulation controller configured to output the first phase signal, the second phase signal, the third phase signal, the first state signal, the second state signal, and the third state signal. Alternatively, the partial method 500 may continue in block 526 with transmitting, by an antenna, the modulated transmission signal.

Figure 6:
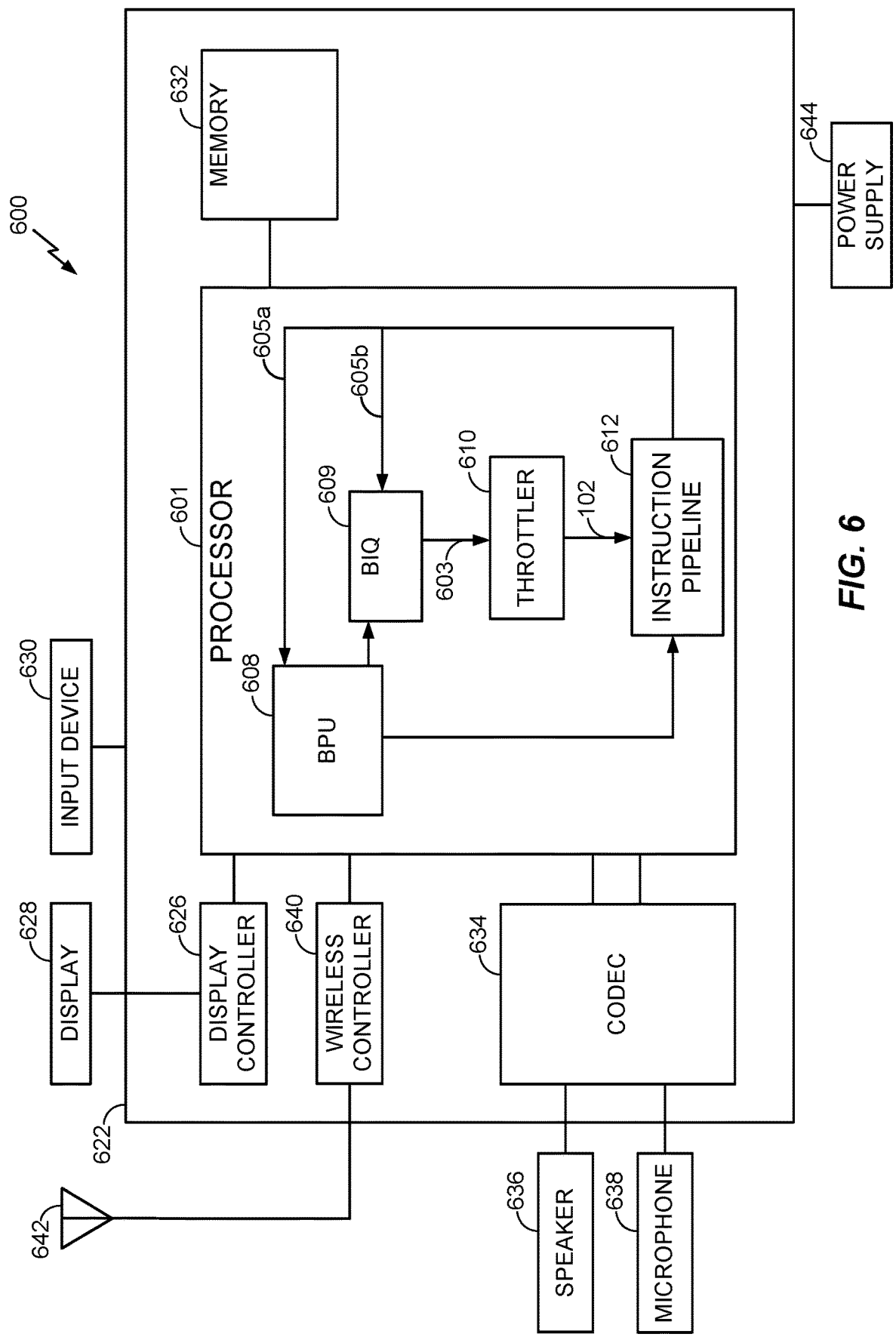
FIG. 6 illustrates an exemplary mobile device in accordance with some examples of the disclosure.

FIG. 6 illustrates an exemplary mobile device in accordance with some examples of the disclosure. Referring now to FIG. 6, a block diagram of a mobile device that is configured according to exemplary aspects is depicted and generally designated 600. In some aspects, mobile device 600 may be configured as a wireless communication device. As shown, mobile device 600 includes processor 601, which may be configured to implement the methods described herein in some aspects. Processor 601 is shown to comprise instruction pipeline 612, buffer processing unit (BPU) 608, branch instruction queue (BIQ) 609, and throttler 610 as is well known in the art. Other well-known details (e.g., counters, entries, confidence fields, weighted sum, comparator, etc.) of these blocks have been omitted from this view of processor 601 for the sake of clarity.

Processor 601 may be communicatively coupled to memory 632 over a link, which may be a die-to-die or chip-to-chip link. Mobile device 600 also include display 628 and display controller 626, with display controller 626 coupled to processor 601 and to display 628.

In some aspects, FIG. 6 may include coder/decoder (CODEC) 634 (e.g., an audio and/or voice CODEC) coupled to processor 601; speaker 636 and microphone 638 coupled to CODEC 634; and wireless controller 640 (which may include a modem) coupled to wireless antenna 642 and to processor 601.

In a particular aspect, where one or more of the above-mentioned blocks are present, processor 601, display controller 626, memory 632, CODEC 634, and wireless controller 640 can be included in a system-in-package or system-on-chip device 622. Input device 630 (e.g., physical or virtual keyboard), power supply 644 (e.g., battery), display 628, input device 630, speaker 636, microphone 638, wireless antenna 642, and power supply 644 may be external to system-on-chip device 622 and may be coupled to a component of system-on-chip device 622, such as an interface or a controller.

It should be noted that although FIG. 6 depicts a mobile device, processor 601 and memory 632 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 7:
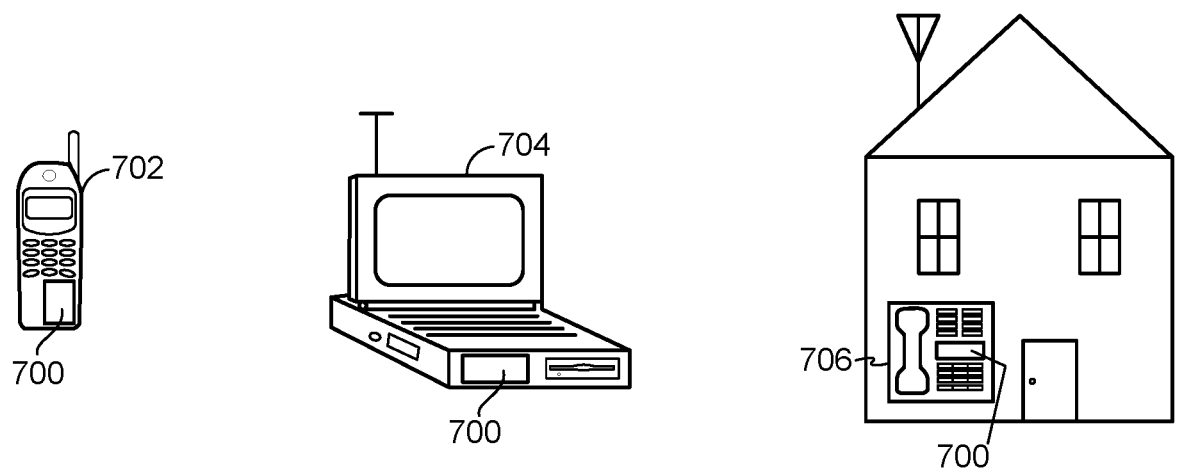
FIG. 7 illustrates various electronic devices that may be integrated with any of the aforementioned devices, modulators, and RF signal generators in accordance with some examples of the disclosure.

FIG. 7 illustrates various electronic devices that may be integrated with any of the aforementioned devices, modulators, RF signal generators, etc. in accordance with some examples of the disclosure. For example, a mobile phone device 702, a laptop computer device 704, and a fixed location terminal device 706 may include an integrated device 700 as described herein. The integrated device 700 may be, for example, any of the integrated circuits, dies, integrated devices, integrated device packages, integrated circuit devices, device packages, integrated circuit (IC) packages, package-on-package devices described herein. The devices 702, 704, 706 illustrated in FIG. 7 are merely exemplary. Other electronic devices may also feature the integrated device 700 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

One or more of the components, processes, features, and/or functions illustrated in FIGS. 1A-7 may be rearranged and/or combined into a single component, process, feature or function or incorporated in several components, processes, or functions. Additional elements, components, processes, and/or functions may also be added without departing from the disclosure. It should also be noted that FIGS. 1A-7 and its corresponding description in the present disclosure is not limited to dies and/or ICs. In some implementations, FIGS. 1A-7 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

In this description, certain terminology is used to describe certain features. The term "mobile device" can describe, and is not limited to, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be incorporated entirely within any form of computer-readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

A complete listing of the claims, including current amendments (if any), is as follows:

1. A polar modulator circuit, comprising:
   a first phase shifting modulation circuit configured to input a first phase signal to generate a first modulation signal and output the first modulation signal, wherein the first phase signal comprises a first phase of polar component information;
   a first power amplifier (PA) coupled to the first phase shifting modulation circuit and configured to input a first state signal, input the first modulation signal, and amplify the first modulation signal, wherein the first modulation signal represents a first link of N links, N is an integer greater than 2 and the first state signal comprises a first magnitude of the polar component information;
   a second phase shifting modulation circuit configured to input a second phase signal to generate a second modulation signal, wherein the second phase signal comprises a second phase of the polar component information;
   a second PA coupled to the second phase shifting modulation circuit and configured to input a second state signal and amplify the second modulation signal, wherein the second modulation signal represents a second link of the N links and the second state signal comprises a second magnitude of the polar component information;
   a third phase shifting modulation circuit configured to input a third phase signal to generate a third modulation signal, wherein the third phase signal comprises a third phase of the polar component information;
   a third PA coupled to the third phase shifting modulation circuit and configured to input a third state signal and amplify the third modulation signal, wherein the third modulation signal represents a third link of the N links and the third state signal comprises a third magnitude of the polar component information; and
   a summation circuit configured to input the N links and output a modulated transmission signal.

2. The polar modulator circuit of claim 1, wherein the N links comprise 3 links and the polar modulator circuit is configured to generate a $2^{2N}$ quadrature amplitude modulation (QAM) based on the N links.

3. The polar modulator circuit of claim 1, wherein each of the first state signal, the second state signal, and the third state signal is configurable to be one of an off state, a positive on state, and a negative on state, and wherein the first phase shifting modulation circuit, the second phase shifting modulation circuit, and the third phase shifting modulation circuit each comprise an all-digital phase locked loop modulation circuit.

4. The polar modulator circuit of claim 1, further comprising a modulation controller configured to input transmission data, the modulation controller coupled to the first phase shifting modulation circuit, the first PA, the second phase shifting modulation circuit, the second PA, the third phase shifting modulation circuit, and the third PA.

5. The polar modulator circuit of claim 4, wherein the modulation controller inputs the transmission data and outputs the first phase signal, the second phase signal, the third phase signal, the first state signal, the second state signal, and the third state signal.

6. The polar modulator circuit of claim 1, wherein the polar modulator circuit is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

7. A method for polar modulation, comprising:
   inputting a first phase signal to a first phase shifting modulation circuit to generate a first modulation signal and output the first modulation signal, wherein the first phase signal comprises a first phase of polar component information;
   inputting a second phase signal to a second phase shifting modulation circuit to generate a second modulation signal, wherein the second phase signal comprises a second phase of the polar component information;
   inputting a third phase signal to a third phase shifting modulation circuit to generate a third modulation signal, wherein the third phase signal comprises a third phase of the polar component information;
   inputting a first state signal to a first power amplifier (PA);
   inputting the first modulation signal, the first PA coupled to the first phase shifting modulation circuit;
   amplifying, by the first PA, the first modulation signal based on the first state signal, wherein the first modulation signal represents a first link of N links, N is an integer greater than 2 and the first state signal comprises a first magnitude of the polar component information;

inputting a second state signal to a second PA, the second PA coupled to the second phase shifting modulation circuit;

amplifying, by the second PA, the second modulation signal based on the second state signal, wherein the second modulation signal represents a second link of the N links and the second state signal comprises a second magnitude of the polar component information;

inputting a third state signal to a third PA, the third PA coupled to the third phase shifting modulation circuit;

amplifying, by the third PA, the third modulation signal based on the third state signal, wherein the third modulation signal represents a third link of the N links and the third state signal comprises a third magnitude of the polar component information;

summing the N links; and outputting a modulated transmission signal based on the summing.

8. The method of claim 7, wherein the N links comprise 3 links and the method generates a $2^{2N}$ quadrature amplitude modulation (QAM) based on the N links.

9. The method of claim 7, wherein each of the first state signal, the second state signal, and the third state signal is configurable to be one of an off state, a positive on state, and a negative on state and wherein the first phase shifting modulation circuit, the second phase shifting modulation circuit, and the third phase shifting modulation circuit each comprise an all-digital phase locked loop modulation circuit.

10. The method of claim 7, further comprising inputting transmission data to a modulation controller configured to output the first phase signal, the second phase signal, the third phase signal, the first state signal, the second state signal, and the third state signal.

11. The method of claim 7, wherein the method is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

12. A non-transitory computer-readable medium comprising instructions that when executed by a processor cause the processor to perform a method comprising:

inputting a first phase signal to a first phase shifting modulation circuit to generate a first modulation signal and output the first modulation signal, wherein the first phase signal comprises a first phase of polar component information;

inputting a second phase signal to a second phase shifting modulation circuit to generate a second modulation signal, wherein the second phase signal comprises a second phase of the polar component information;

inputting a third phase signal to a third phase shifting modulation circuit to generate a third modulation signal, wherein the third phase signal comprises a third phase of the polar component information;

inputting a first state signal to a first power amplifier (PA);

inputting the first modulation signal, the first PA coupled to the first phase shifting modulation circuit;

amplifying, by the first PA, the first modulation signal based on the first state signal, wherein the first modulation signal represents a first link of N links, N is an integer greater than 2 and the first state signal comprises a first magnitude of the polar component information;

inputting a second state signal to a second PA, the second PA coupled to the second phase shifting modulation circuit;

amplifying, by the second PA, the second modulation signal based on the second state signal, wherein the second modulation signal represents a second link of the N links and the second state signal comprises a second magnitude of the polar component information;

inputting a third state signal to a third PA, the third PA coupled to the third phase shifting modulation circuit;

amplifying, by the third PA, the third modulation signal based on the third state signal, wherein the third modulation signal represents a third link of the N links and the third state signal comprises a third magnitude of the polar component information;

summing the N links; and outputting a modulated transmission signal based on the summing.

13. The non-transitory computer-readable medium of claim 12, wherein the N links comprise 3 links and the method generates a $2^{2N}$ quadrature amplitude modulation (QAM) based on the N links.

14. The non-transitory computer-readable medium of claim 12, wherein each of the first state signal, the second state signal, and the third state signal is configurable to be one of an off state, a positive on state, and a negative on state and wherein the first phase shifting modulation circuit, the second phase shifting modulation circuit, and the third phase shifting modulation circuit each comprise an all-digital phase locked loop modulation circuit.

15. The non-transitory computer-readable medium of claim 12, further comprising inputting transmission data to a modulation controller configured to output the first phase signal, the second phase signal, the third phase signal, the first state signal, the second state signal, and the third state signal.

16. The non-transitory computer-readable medium of claim 12, wherein the method is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

* * * * *